March 2, 1954  C. F. ROBINSON ET AL  2,671,177

ELECTROSTATIC CHARGING APPARATUS

Filed Sept. 4, 1951

INVENTORS;
CHARLES F. ROBINSON
ARVO A. LAHTI
BY
James B. Christie
ATTORNEY.

Patented Mar. 2, 1954

2,671,177

UNITED STATES PATENT OFFICE 2,671,177

ELECTROSTATIC CHARGING APPARATUS

Charles F. Robinson and Arvo A. Lahti, Pasadena, Calif., assignors to Consolidated Engineering Corporation, Pasadena, Calif., a corporation of California Application September 4, 1951, Serial No. 244,992

9 Claims. (Cl. 310—6)

This invention relates to an improved electrostatic generator for providing an electric charge.

In radioactive surveying instruments it is necessary to charge a capacitive system to a high potential from a high impedance source. Ordinarily it is desirable to provide a manually driven generator for producing the electric charge for such instruments so that the instruments may be used in any location without requiring conventional primary sources of voltage such as batteries, power lines, or motor-generator sets.

In accordance with the present invention, a manually operated electrostatic generator for producing a charge for a capacitive system is provided in which a friction type generator is employed to produce an electrostatic potential, and an induction type generator is employed to convey an electric charge from the friction generator to the capacitive load and to isolate the friction generator from the capacitive load. Both the friction generator and the induction generator are actuated by a single crank which may be manually operated. The induction type electrostatic generator is arranged so that the capacitive load is charged when the crank is rotated in one direction and so that the capacitive load is discharged at a low incremental rate when the crank is rotated in the opposite direction, thereby providing means for adjusting the amount of charge or the voltage which is applied to the capacitive load.

Figure 1:
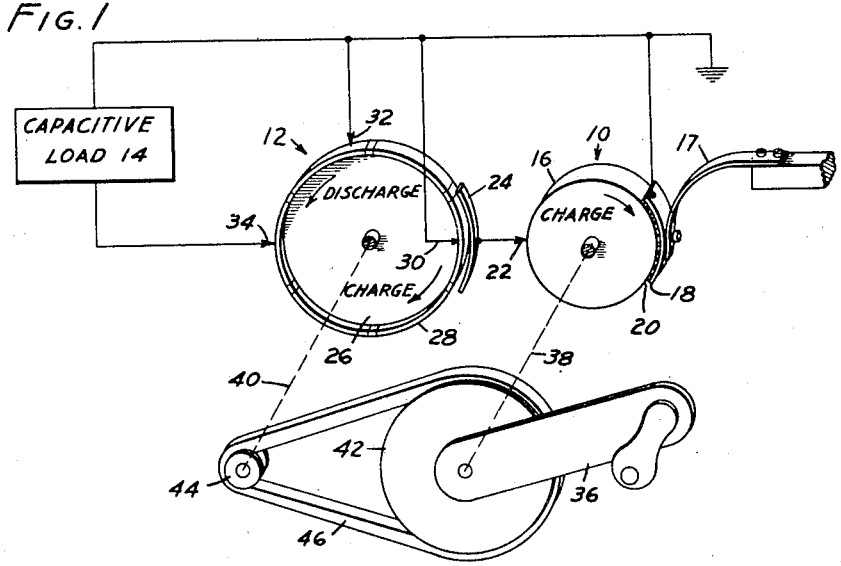
Figure 2:
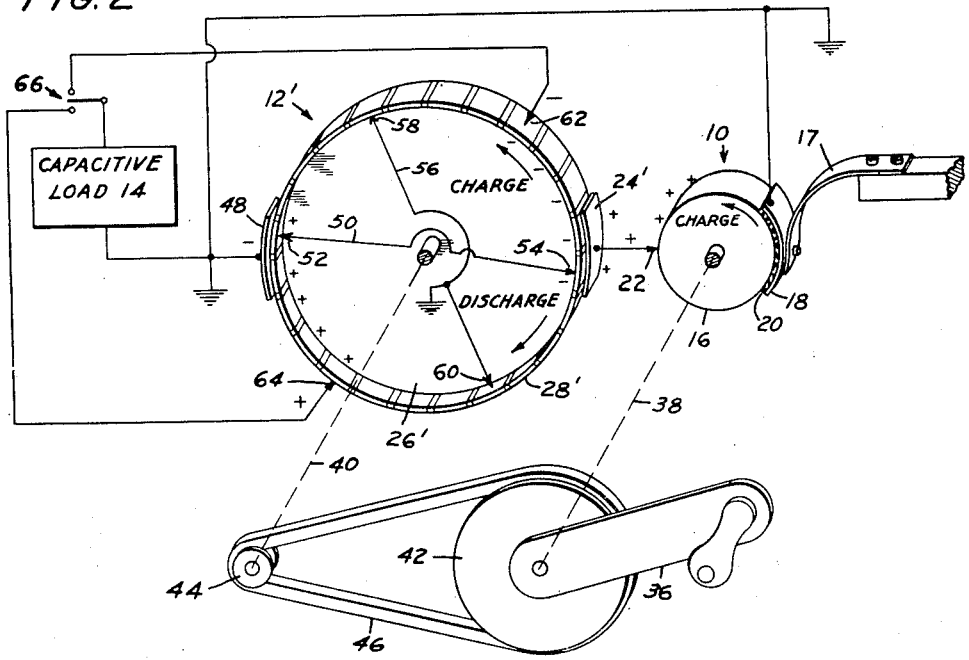

The invention will be explained with reference to the drawings, in which:

Fig. 1 is a schematic diagram of a preferred embodiment of the apparatus of the present invention; and Fig. 2 is a schematic diagram of a modification of the apparatus shown in Fig. 1.

The apparatus disclosed in Fig. 1 comprises a friction generator 10 and an induction generator 12 arranged so that the friction generator 10 serves to provide a charge on the inducing electrode of the induction generator 12 and so that the induction generator 12 serves to convey a charge to a capacitive load 14.

The friction generator 10 comprises a rotor 16 which is a cylindrical disk composed of a good insulating material such as polystyrene or amber. A grounded charging brush is secured in intimate contact with the rotor 16 by means of a spring 17 and the charging brush comprises a cylindrical conductive member 18 having a facing 20 composed of a semi-conducting material such as leather or nylon, which is capable of inducing a charge by friction on the rotor 16. A conductive collecting brush 22 engages the rotor 16 on the side opposite the charging brush.

A cylindrical stator plate 24, which is electrically connected to the collecting brush 24, serves as the inducing electrode for the induction generator 12.

The rotor of the induction generator 12 comprises a cylindrical disk 26 which is composed of a good insulating material such as polystyrene, having a plurality of conductive cylindrical segments 28 secured to the periphery thereof. The rotor segments 28 are evenly spaced around the periphery of the disk 26, and they are insulated from one another. The rotor segments 28 are slightly shorter than the stator plate 24, and are so arranged that the rotor plates 28 are caused to rotate past the stator plate 24 when the disk 26 is rotated. Two grounded brushes 30 and 32 make contact with the rotor segments 28 when the member 26 is rotated, and the brushes are disposed so that the brush 30 makes contact with the rotor segments 28 as they pass in close proximity to the stator plate 24 and so that the brush 32 makes contact with the rotor segments 28 at some angular location wherein the rotor segments are out of mesh with the stator 24. A collector brush 34 also makes contact with the rotor segments 28 at another angular location wherein the respective rotor segments which are contacted by the brush 34 are out of mesh with the stator 24. The three brushes 30, 32 and 34 are so arranged that no two brushes ever make contact with the same rotor section simultaneously.

A crank 36 is employed to drive the two rotors 16 and 26 simultaneously through shafts 38 and 40, a system of pulleys 42 and 44, and a belt 46.

When the crank 36 is turned clockwise the friction generator 10 serves to produce a charge on the stator plate 24, since the stator plate 24 and the respective grounded rotor segments 28 which mesh with the stator plate 24 provide capacitances which are successively connected in series across the output of the induction generator 10. Thus, each rotor segment 28 which meshes with the stator plate 24 has a charge induced on it which is equal to but of opposite polarity with respect to the charge on the stator plate 24, the charge on the rotor segment 26 being drawn from ground through the brush 30.

As each charged rotor segment 28 is rotated in a clockwise direction, the ground connection is broken while the rotor segment is still partially in mesh with the stator 24, and hence the charge remains on the rotor segment until the rotor segment contacts the collector brush 34. Since a capacitive load 14 is connected between the brush 34 and ground, a portion of the electric charges on the rotor segments 28 is transferred to the capacitive load 14, and if the capacitance of the load 14 is large with respect to the capacitance of the individual rotor segments 28 to ground when they are in mesh with the stator plate 24, all but a small fraction of the charges on the rotor segments 28 will be transferred to the load 14.

When the crank 36 is turned in a counterclockwise direction, a charge is similarly induced on the rotor segments 28. However, the grounded brush 32 makes contact with the rotor segments 28 before they reach the collector brush 34, and hence the charge on the rotor segments 28 flows to ground. When the discharged rotor segments 28 make contact with the collector brush 34, a portion of the charge of the capacitive load 14 is drawn off due to the capacitance between the rotor segments 28 and ground, the size of the charge being in conformance with standard capacitive charge division relations. Since the capacitance between the rotor segments 28 and ground is small with respect to the capacitance of the load 14, only a small increment of the charge of the capacitive load 14 is drawn off when a rotor segment 28 contacts the brush 34 while rotating in a counterclockwise direction.

Thus, a capacitive load 14, such as an ionization chamber for a radioactive surveying instrument, may be charged by manually turning the crank 36 in a clockwise direction, and if the capacitive load 14 is overcharged, small increments of the charge may be removed by manually turning the crank 36 in a counterclockwise direction. Accordingly, the apparatus shown in Fig. 1 provides means for accurately controlling the amount of charge, and hence the voltage, which is applied to the capacitive load 14.

The modification of the invention which is disclosed in Fig. 2 provides a charge which is either positive or negative with respect to ground, or if desired, the apparatus may be employed to provide positive and negative charges to separate loads.

The friction type generator 10 is the same as that disclosed in Fig. 1.

The induction type generator 12' differs from that shown in Fig. 1 in that the length of the rotor segments 28' is less than half the length of the stator plate 24'. An additional stator plate 48 is provided, and two fixed brushes 52 and 54, which are connected by a conductor 50, provide a short circuit between two diametrically opposed rotor segments 28' which are in mesh with the respective stator plates 24' and 48. Two fixed brushes 58 and 60, which engage diametrically opposed rotor segments 28' at some angular location wherein the rotor segments 28' are not in mesh with the stator sections 24' and 48, are connected together and to ground by a conductor 56.

A pair of collector brushes 62 and 64 which engage diametrically opposed rotor segments 28' are employed to convey the electric charges on the rotor segments 28' to the capacitive load 14.

In the embodiment of the invention shown in Fig. 2, a switch 66 is employed to connect either of the collector brushes 62 and 64 to the load 14, thereby permitting the application of either a positive or a negative charge to the load 14.

It will be apparent that the apparatus shown in Fig. 2 may be employed to apply a positive charge to one capacitive load and a negative charge to another capacitive load, if desired.

When the rotors 16 and 26' are rotated in a counterclockwise direction, the friction generator 10 serves to produce a charge on the interconnected rotor segments 28' which are in mesh with the stator plates 24' and 48 as shown in Fig. 2, since these rotor segments and the stator plates 24' and 48 provide two capacitances which are connected in series across the output of the induction generator 10. This charge remains on the rotor segments until they contact the collector brushes 62 and 64, whereupon the charges of one polarity may be applied to the load 14 through the switch 66.

When the rotors 16 and 26' are rotated in a clockwise direction, the grounded brushes 58 and 60 serve to cause the charges on the rotor segments 28' to flow to ground before they reach the collector brushes 62 and 64. As before, when the discharged rotor segments 28' make contact with the collector brushes, a portion of the charge of the capacitive load is drawn off, thereby providing means for accurately controlling the amount of charge on the capacitive load 14.

It will be apparent that the apparatus disclosed herein may be employed to charge capacitive systems other than those employed in radioactive surveying instruments provided the average current drain of the capacitive system is very low.

We claim:

1. Electrostatic apparatus comprising a plurality of spaced conductive members located around an axis, conductive means located in the proximity of the conductive members for providing an electrostatic inductive coupling to the conductive members when they are in mesh therewith, means for rotating the conductive members around said axis and causing the conductive members to mesh with the conductive means in sequence, means for applying an electrostatic voltage between the conductive means and each of the conductive members during a portion of the periods when each of the conductive members is in mesh with the conductive means, means for collecting the electrostatic charges which are induced on the conductive members when they are rotated in one direction, and means for discharging the electrostatic charges which are induced on the conductive members when they are rotated in the other direction.

2. Electrostatic apparatus comprising a rotatable disk having a plurality of evenly spaced conductive members secured to the periphery thereof and electrically insulated from one another, conductive means located adjacent to the periphery of the disk for providing an electrostatic inductive coupling to the conductive members when they are in mesh therewith, means for rotating the disk and causing the conductive members to mesh with the conductive means in sequence, means for applying an electrostatic voltage between said conductive means and each of the conductive members during a portion of the periods when each of the conductive members is in mesh with the conductive means, means for collecting the electrostatic charges which are induced on the conductive members when the disk is rotated in one direction, and grounded means separate from the collecting means for discharging the electrostatic charges on the conductive members when the disk is rotated in the other direction.

3. The apparatus of claim 2, wherein the conductive means comprises a pair of inducing electrodes located at different angular positions around the periphery of the disk, and wherein the means for applying an electrostatic voltage between the conductive means and each of the conductive members comprises an electrostatic generator having its output circuit connected to the two inducing electrodes, and a conductor which successively interconnects pairs of the conductive members when they are in mesh with the two inducing electrodes.

4. Electrostatic apparatus comprising a rotatable disk, a plurality of evenly spaced conductive members secured to the periphery of the disk and electrically insulated from one another, a pair of inducing electrodes located on diametrically opposite sides of the disk adjacent to the periphery thereof, means for rotating the disk and causing the conductive members to mesh with the inducing electrodes in sequence, an electrostatic generator having its output circuit connected between the pair of inducing electrodes, fixed conductive means for providing a sliding contact between pairs of the conductive members which are located on diametrically opposite sides of the disk during a portion of the periods when the pairs of conductive members are in mesh with the inducing electrodes, a pair of collector brushes located on diametrically opposite sides of the disk for collecting the electrostatic charges which are induced on the conductive members when the disk is rotated in one direction, and a pair of grounded brushes located on diametrically opposite sides of the disk intermediate the collector brushes and the inducing electrodes for discharging the electrostatic charges on the conductive members when the disk is rotated in the opposite direction.

5. Electrostatic apparatus comprising a first conductive member, a plurality of spaced conductive members located around an axis and adapted to be rotated adjacent to and past said first conductive member and thereby mesh with the first conductive member in sequence, means for applying a voltage between the first conductive member and each of the members of said plurality of conductive members during a portion of the periods when the members of said plurality of conductive members are in mesh with said first conductive member, a collector means for contacting each of the members of said plurality of conductive members in sequence as said plurality of conductive members are rotated, and a grounded means separated from the collector means for contacting each of the members of said plurality of conductive members in sequence as said plurality of conductive members are rotated.

6. Electrostatic apparatus comprising a non-conductive rotatable disk, a plurality of spaced conductive members secured to the periphery of the disk, an inducing electrode located adjacent to the periphery of said rotatable disk for providing an electrostatic inductive coupling to the conductive members when they are in mesh with the inducing electrode, means for applying a voltage between said inducing electrode and each of the conductive members during a portion of the periods when each of the conductive members is in mesh with the inducing electrode, a collector electrode for contacting each of the conductive members in sequence as the rotatable disk is rotated, and a grounded electrode spaced from the collector electrode for also contacting each of the conductive members in sequence as the rotatable disk is rotated.

7. Electrostatic charging apparatus comprising a non-conductive rotatable member having a plurality of evenly spaced conductive members of the same size secured thereto, an inducing electrode located adjacent to the periphery of the rotatable member for providing an electrostatic inductive coupling to the conductive members when they are in mesh with the inducing electrode, the inducing electrode being larger than the members of said plurality of conductive members, a brush for providing a sliding contact with each of the conductive members when it is in mesh with the inducing electrode, an electrostatic generator having its output circuit connected to the brush and the inducing electrode, and means for providing a sliding contact with each of the conductive members in sequence as the rotatable member is rotated.

8. Electrostatic apparatus comprising a non-conductive rotatable member having a plurality of evenly spaced cylindrical conductive members of the same size secured thereto, a cylindrical inducing electrode located adjacent to the periphery of the rotatable member for providing an electrostatic inductive coupling to the members of said plurality of conductive members when they are in mesh with the inducing electrode, the inducing electrode having a length along the plane of rotation of the rotatable member which is greater than the length of each of the conductive members along the plane of rotation of the rotatable member, a brush for providing a sliding contact with each member of said plurality of conductive members during a portion of the periods when the member is in mesh with the inducing electrode, an electrostatic generator having its output circuit connected to the brush and the inducing electrode, means for providing a sliding contact with each of the members of said plurality of conductive members in sequence as the rotatable member is rotated, and grounded means for providing a further sliding contact with each of the members of said plurality of conductive members in sequence as the rotatable member is rotated.

9. Electrostatic apparatus comprising a rotatable member having a plurality of evenly spaced conductive members of the same size secured thereto and electrically insulated from one another, a further conductive member located adjacent to the periphery of and in the plane of rotation of said rotatable member for providing an electrostatic inductive coupling to the members of said plurality of conductive members when they mesh with the further conductive member, the length of said further conductive member along the plane of rotation of the rotatable member being larger than the length of the members of said plurality of conductive members along the plane of rotation of said rotatable member, a charging electrode for providing a sliding contact with each member of said plurality of conductive members when it meshes with the further conductive member, an electrostatic generator having its output circuit connected to the charging electrode and said further conductive member, a collector electrode for providing a sliding contact with each of the members of said plurality of conductive members in sequence as said rotatable member is rotated, and a grounded electrode separated from the collector electrode for providing a further sliding contact with each of the members of said plurality of conductive members in sequence as said rotatable member is rotated.

CHARLES F. ROBINSON.
ARVO A. LAHTI.

References Cited in the file of this patent
UNITED STATES PATENTS

| Number | Name | Date |
|---|---|---|
| 479,941 | Henry | Aug. 2, 1892 |
| 2,540,327 | Felici | Feb. 6, 1951 |
| 2,577,446 | Bosch | Dec. 4, 1951 |
| 2,577,542 | Roudaut | Dec. 4, 1951 |